United States Patent [19]

Jha et al.

[11] 4,062,756
[45] Dec. 13, 1977

[54] LIQUID FLOW DISTRIBUTION SCREEN

[75] Inventors: Anil D. Jha, Littleton; Gary C. Ganzi, Lexington, both of Mass.

[73] Assignee: Ionics, Inc., Watertown, Mass.

[21] Appl. No.: 774,823

[22] Filed: Mar. 7, 1977

[51] Int. Cl.² ............................................. B01D 13/02
[52] U.S. Cl. ................................. 204/301; 204/180 P
[58] Field of Search ...................... 204/180 P, 301, 279

[56] References Cited

U.S. PATENT DOCUMENTS

| | | | |
|---|---|---|---|
| 2,891,899 | 6/1959 | Mason et al. | 204/301 |
| 2,948,668 | 8/1960 | DeWhalley et al. | 204/301 |
| 3,235,481 | 2/1966 | Zwart, Jr. | 204/301 |
| 3,271,292 | 9/1966 | Kollsman | 204/301 X |
| 3,284,335 | 11/1966 | Tsunoda et al. | 204/301 |
| 3,761,386 | 9/1973 | Smith | 204/301 |
| 3,878,086 | 4/1975 | Haswell et al. | 204/301 |
| 3,933,617 | 1/1976 | Yamamoto et al. | 204/301 |

*Primary Examiner*—Arthur C. Prescott
*Attorney, Agent, or Firm*—Norman E. Saliba; John M. Brandt

[57] ABSTRACT

A liquid flow distribution screen is disclosed in which two sets of spaced apart strands are oriented at an angle to each other to form a mesh screen. A portion of the screen is composed of areas in which the two sets of strands are more or less of the same thickness and the remaining portion composed of strands in which one of the sets is of greater thickness than the other, resulting in the creation of liquid flow channels between and among the channels. Using this concept, any desired flow pattern may be achieved when the screen is placed between two surface barriers. The device is particularly suited as a membrane support and spacer in electrodialysis or electrochemical apparatus.

7 Claims, 4 Drawing Figures

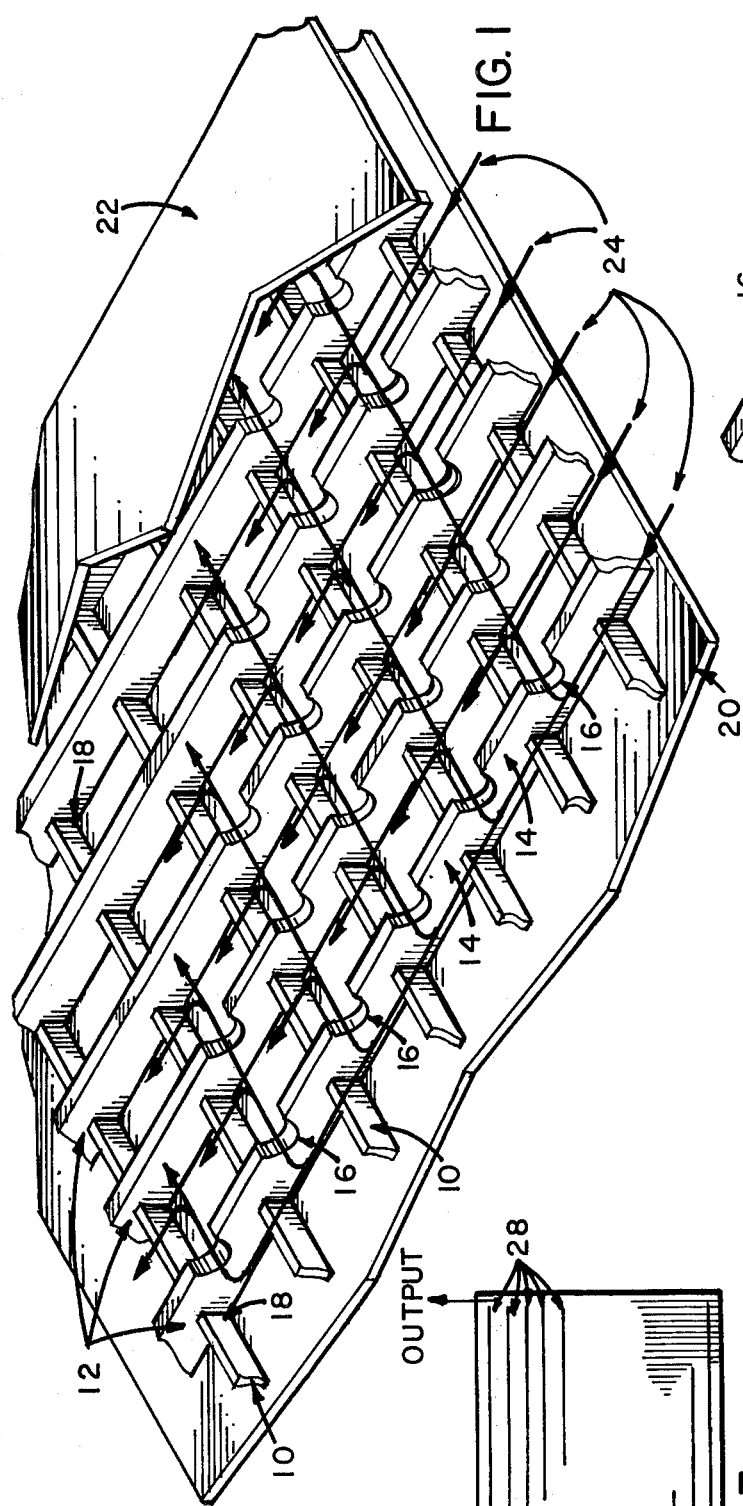
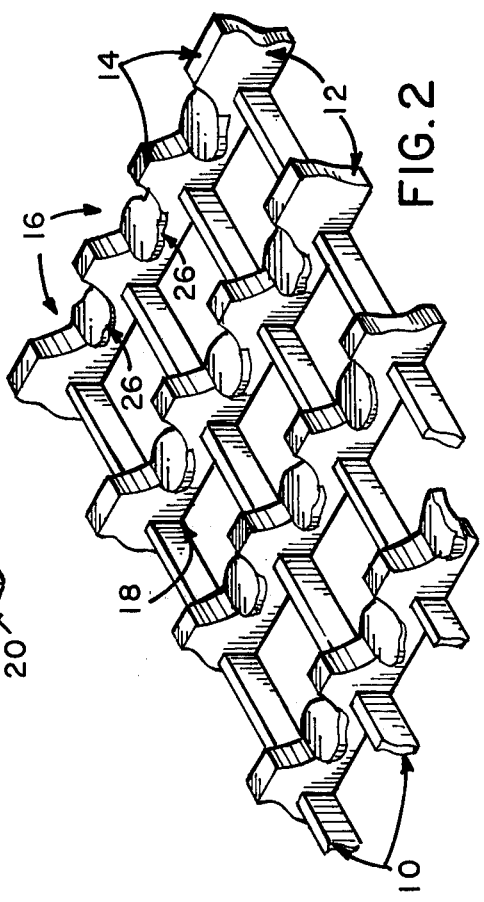
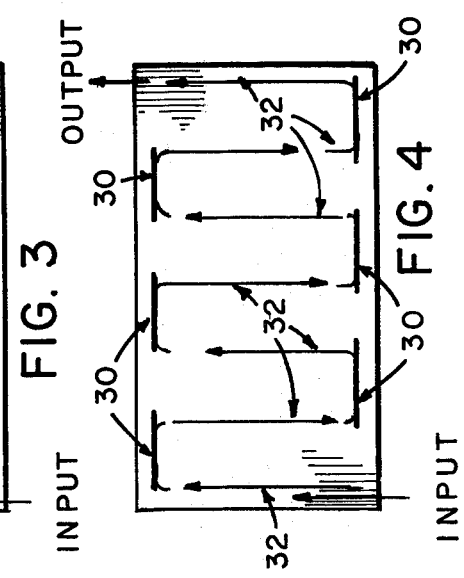
FIG. 1
FIG. 2
FIG. 3
FIG. 4

LIQUID FLOW DISTRIBUTION SCREEN

BACKGROUND OF THE INVENTION

1. Field of the Invention

The invention relates to liquid flow distribution screens and particularly to those that may be used as a membrane support and spacer in electrodialysis cells and similar apparatus.

2. Description of the Prior Art

In electrodialysis cells there is a requirement for membrane supports which also provide for liquid or electrolyte flow and contact with the membrane. These supports should be constructed so that there is maximum contact between the electrolyte and the membrane. The supports must additionally provide separation between one membrane and another or between a membrane and electrode to a very close tolerance in order to insure the highest possible efficiency of operation.

A number of devices exist in the prior art for the purposes described. In some, the flow device is fed with electrolyte over its entire length as is illustrated in U.S. Pat. No. 2,735,812, VanHoek. In that patent, corrugated sheets having a multiplicity of perforations are disclosed as membrane supports. In another, U.S. Pat. No. 3,073,774, Roberts, a cloth-like plastic mesh is used. In these types of devices, feeding liquid over the entire screen often imposes undesirable design constraints on the frame and conduit structure of the cell.

An additional approach allowing for small points of liquid input and output is shown in U.S. Pat. No. 3,520,803, Ianconelli, in which flat sheets having a cut out or etched central portion defining a tortuous path are employed as spacers. These, however, have the disadvantage of reducing the active membrane area, are subject to high pressure drops, and are fragile and thus, difficult and expensive to manufacture.

The present invention is designed to overcome the above problems by providing a screen which is easy and inexpensive to manufacture while maintaining close tolerances, which allows for point to point liquid input and output which maximizes membrane exposure to fluid flow and, above all, allows for any desired pattern of fluid flow at minimum pressure dropss as may suit the particular application at hand. Accordingly, these and other features and advantages of the invention will become more obvious from the summary below.

SUMMARY OF THE INVENTION

The invention may be summarized as a liquid flow distribution screen particularly suitable for use as a membrane support and spacer in an electrodialysis cell. The screen is composed of two sets of spaced apart strands. Preferably composed of plastic, the strands are usually oriented at right angles to one another, although other angles might be used, to form a rectangular or square mesh. One set of strands of substantially uniform thickness forms a reference base for the screen, the other set molded integrally with the first is also substantially uniform and greater in thickness than the first, with the exception of selected portions which are of a reduced thickness. By selecting which strands of the second set are of a lesser or reduced thickness, channels are established between the strands which result in a particular liquid flow pattern when a liquid is fed to the screen. There must of course be lower and upper barriers to hold the liquid within the confines of the screen.

Any flow pattern may be established which fits the requirements of the apparatus in which the invention is to be utilized. In addition to electrodialysis devices, the concept is suitable for electrochemical, ultrafiltration, reverse osmosis, heat exchanger and filter press units, as well as any system where liquid distribution coupled with a liquid barrier or membrane support is required.

A screen constructed in the above manner offers great flexibility in meeting design criteria in the areas of flow distribution, turbulence, pressure drop, and liquid entrance and exit points.

The invention is more fully disclosed in the description of the preferred embodiment and drawings which follow.

DESCRIPTION OF THE DRAWINGS

FIG. 1 is a perspective view of the generalized preferred embodiment of the invention;

FIG. 2 is a perspective view of an enlarged portion of FIG. 1;

FIG. 3 is a diagrammatic representation of one form of the generalized preferred embodiment; and FIG. 4 is a diagrammatic representation of an additional form of the generalized preferred embodiment.

DESCRIPTION OF THE PREFERRED EMBODIMENT

Referring to FIG. 1, there is shown in generalized form a perspective view of the preferred embodiment of the invention. Two sets of spaced apart strand elements are oriented at a ninety degree angle to provide a square mesh screen. The angle of orientation and the spacing is a matter of choice depending upon how and in what apparatus the screen is employed. For example, the angle might be 45° yielding a screen with diamond shaped spacings.

The first set of strands, 10, is of substantially uniform thickness. The second set 12 is composed of segments 14 which are of a greater thickness than strands 10 and of segments 16 which are of a lesser thickness than segments 14. The thickness of the thicker segments 14 of strands 12 defines the upper plane of the screen.

All of the strands of the first and second set have a common lower or base plane and are considered to be integral at their points of intersection 18.

The screen is shown positioned against surface or barrier 20, a membrane in an electrodialysis cell for example, which acts to contain a liquid. The screen is overlayed by an additional barrier 22 opposite to surface 20 and spaced apart therefrom by segments 14 of strands 12. This surface, another membrane for example, also acts to contain the liquid. A selected liquid, an electrolyte for example, is introduced under pressure into the cell formed by the screen and the two surfaces at the input point and passes along the channels which are defined by segments 14 and 16. Segments 14 act to block flow while segments 16 allow passage. Segments 16 may be as thick as desired as long as they are less thick than segments 14. They may be equal to or less thick than strands 10, for example.

A typical flow pattern is indicated by arrows 24. As will be seen, liquid flows in both directions along the screen at strand segments 16 and in only one direction at strand segments 14. Strands 10 additionally act to promote turbulence as the liquid flows over then insuring that the chemical composition of the liquid in contact with the membranes is as homogeneous as possible.

Such a screen may be fabricated from a commercially available plastic mesh or netting such as is supplied by the Conwed Corporation, Minneapolis, Minnesota. In particular, their product designated SX-2117 consisting of a high density polyethylene having three strands per square inch is especially suitable. That material is manufactured in a manner such that all of the strands in one direction comparable to strands 10 are of a uniform thickness and all of the strands in the other direction comparable to strands 12 are also of a uniform thickness greater than that of strands 10. Strand segments 14 are therefore already inherently present in this material. Segments 16 are introduced into the screen by cutting out or preferably by crushing a portion of segments 14 in the desired pattern using heat. Thus an electrically heated bar may be used to create channels across the screen while the composition of the material itself provides channels in the orthogonal direction.

FIG. 2 is an elarged illustration of a portion of FIG. 1 showing the results of crushing the strands of the commercial material by heat and pressure. The material of a strand 12 is melted and deformed under pressure at 16 to a reduced thickness resulting in a small amount of excess plastic 26 overflowing into the space between the strands. This small amount of overflow in no way inhibits the functioning of the screen.

Referring next to FIG. 3, there is illustrated a rectangular screen with a plurality of rows 28 of crushed strand segments formed according to the above method. Input and output points are specified and flow is in two directions; from bottom to top or in the lateral direction all along the screen and from side to side or in the transverse direction in the channels indicated as crushed rows 28. The design shown wherein the crushed rows 28 diminish in length near the central portion of the screen is particularly useful in an electrodialysis cell since the spacing arrangement of the cross channels maintains membrane support and results in a uniform distribution of electrolyte flow without sever pressure drop from liquid input point to output point. It will be appreciated that the liquid flow and pressure drop characteristics will be governed largely by the number and length of crushed rows and the thickness of said rows.

FIG. 4 depicts an additional configuration of crushed strand segments which may be formed according to the above method. Liquid flow is again from bottom to top all across the screen since the thicker strand segments run in that direction, and across the screen at rows 30. The flow path is indicated by arrows 32. In both of the above examples, it is assumed that, as well as surface membranes on either face of the screen, edge barriers are present aroung the periphery to contain the liquid.

Other flow patterns and applications will not become apparent to those skilled in the art from the above disclosure.

Accordingly, the scope of the invention is defined by the following claims.

The embodiments of this invention in which an exclusive property or privilege is claimed are defined as follows:

1. A liquid flow distribution screen for routing and channelling a liquid over a surface comprising in combination:
   a. a first set of spaced apart strand elements of a first substantially uniform thickness arranged in a plane to define a base plane of said screen:
   b. a second set of spaced apart strand elements attached to and oriented at an angle to said first set, all of said second set positioned coincident with said first set at the base plane of said screen, a portion of said second set arranged to be of a second substantially uniform thickness greater than that of said first set to define an upper plane of said screen, and a portion of said second set arranged to be of a lesser thickness than said second uniform thickness whereby a plurality of flow channels are created across said screen in both the directions of said first and second set of strand elements.

2. The apparatus of claim 1 wherein said first and second sets of strands are oriented at right angles to one another.

3. The apparatus of claim 2 wherein said screen is rectangular in shape.

4. The apparatus of claim 3 wherein the central portion of said screen is comprised of parallel channels in the lateral direction and the outer portions of said screen are comprised in part of parallel channels in the transverse direction.

5. The apparatus of claim 4 wherein said parallel channels in the transverse direction decrease in length from the outer edges to the central portion of said screen.

6. The apparatus of claim 3 wherein said channels define a tortuous fluid flow path across said screen.

7. In an electrodialysis cell a membrane spacer and support liquid flow distribution screen comprising in combination:
   a. a first set of spaced apart strand elements of substantially uniform thickness arranged in a plane to define a base plane of screen;
   b. a second set of spaced apart strand elements attached and oriented orthogonally to said first set, all of said second set positioned conincident with said first set at said screen, a portion of said second set arranged to be of a second substantially uniform thickness greater than that of said first set to define an upper plane of said screen, and a portion of said second set arranged to be of a lesser thickness than said second uniform thickness creating a plurality of flow channels across said screen in both the directions of said first and second sets of strand elements, the central portion of said screen comprised of parallel channels in the transverse direction, said parallel channels in the transverse direction decreasing in length from the outer edges to the central portion of said screen.

* * * * *